United States Patent [19]
Nowak, Jr. et al.

[11] Patent Number: 6,098,576
[45] Date of Patent: Aug. 8, 2000

[54] ENHANCED SPLIT COOLING SYSTEM

[75] Inventors: Theodore John Nowak, Jr.; Gregory Alan Marsh; Peter Loring Valentine; Mahesh Chand Aggarwal, all of Erie, Pa.; Wayne Arthur Rhodes, Luray; Geoffrey Daniel Smith, Jackson, both of Tenn.

[73] Assignee: General Electric Company, Erie, Pa.

[21] Appl. No.: 09/249,516

[22] Filed: Feb. 12, 1999

[51] Int. Cl.[7] .................................................. F01P 11/08
[52] U.S. Cl. ................................. 123/41.33; 123/41.29
[58] Field of Search .......................... 123/41.29, 41.33, 123/196 AB

[56] References Cited

U.S. PATENT DOCUMENTS

| | | | |
|---|---|---|---|
| 4,620,509 | 11/1986 | Crofts | 123/41.33 |
| 5,048,596 | 9/1991 | Lu | 123/41.33 |
| 5,056,601 | 10/1991 | Grimmer | 123/41.33 |
| 5,201,285 | 4/1993 | McTaggart | 123/41.31 |
| 5,337,704 | 8/1994 | Roth | 123/41.29 |
| 5,381,762 | 1/1995 | Evans | 123/41.29 |
| 5,415,147 | 5/1995 | Nagle et al. | 123/563 |
| 5,505,164 | 4/1996 | Hollis | 123/41.33 |
| 5,730,089 | 3/1998 | Morikawa et al. | 123/41.33 |

*Primary Examiner*—John Kwon
*Attorney, Agent, or Firm*—Marvin Snyder; James H. Buesse

[57] ABSTRACT

An enhanced split cooling system for a turbocharger and an engine includes an oil cooler, a three-way valve assembly and a four-way valve assembly for controlling the flow of coolant, and radiators and subcoolers, for controlling coolant temperature. The valve assemblies are independently controllable to direct coolant through an oil cooler and a turbocharger intercooler either directly from the engine if the oil cooler and intercooler require heating or from the radiators and subcoolers if the oil cooler and intercooler require cooling. Depending upon the engine operating temperature, the valve assemblies can be configured to establish at least three different coolant processing modes.

11 Claims, 4 Drawing Sheets

ENHANCED SPLIT COOLING SYSTEM

BACKGROUND OF THE INVENTION

The present invention relates to a cooling system for high-power internal combustion engines and, more particularly, to an enhanced split cooling system for a diesel engine powered rail traction vehicle with a single cooling pump.

Self-propelled rail traction vehicles such as locomotives typically use diesel engines as prime movers and depend on petroleum based lubricating oil to prevent friction and wear and to provide some of the cooling in such engines. The lubricating oil, in turn, must be cooled to prevent degradation and consequential engine damage.

Because diesel engines subject lubricating oil to high temperatures in the presence of air and catalytically active metals and metallic compounds, oxidation of the oil occurs and this may lead to increased viscosity and formation of acids, carbon residue, sludge, and asphaltenes. Such changes in the oil can promote deposit formation and ring sticking, and accelerated wear and corrosion of bearing materials. Above 150° F., an approximate rule of thumb is that the rate of oxidation doubles for each additional 18° F. temperature rise. Therefore, higher temperature leads to shorter oil life. Additionally, oil viscosity declines with temperature, causing the lubricating film thickness in engine bearings to also decrease. If the film thickness becomes too small, aspirates on the opposing bearing surfaces will cause accelerated wear in a process known as boundary lubrication (as opposed to the desired hydrodynamic lubrication). This is especially important at high bearing loads and low shaft speeds.

As with any internal combustion engine, engine lube oil degradation necessitates oil changes at regular intervals. In order to make these oil change intervals as long as possible for economy, a controlled burn rate is established in the engine through ring design that necessitates additions of oil or "sweetening" between oil changes. In addition, rapid oxidation of the oil and/or undesirably low viscosity at the bearings is at least partially avoided during engine operation by limiting the maximum bulk temperature of the oil leaving the engine by reducing the engine power output when a maximum oil temperature set point is detected by a lube oil temperature sensor. A conservative rule of thumb for journal bearings is that the maximum film temperature should not exceed 180° F. Because oil is often used for piston cooling in addition to bearing lubrication, some engines may have oil exiting the engine at temperatures approaching 250° F., especially when operating in extreme conditions.

Cooling systems for internal combustion engines, such as in locomotives, are known in the art for the purpose of maintaining engine temperature and lubricating oil temperatures within desired operating parameters. In all such systems, ambient air is forced through heat exchangers and the cooling capability is constrained by the temperature of the ambient air as well as other factors. For example, U.S. Pat. No. 5,201,285 describes a controlled cooling system for a turbocharged internal combustion engine having liquid coolant to absorb heat from the engine jackets and turbochargers ("turbos"), a pump to circulate coolant through the cooling system, a fan to force air in heat exchange with a primary coolant radiator, and a secondary coolant radiator ("subcooler") in the upstream air flow of the primary radiator. The subcooler provides lower temperature coolant to remove heat from the hot, compressed engine intake air in the charge air cooler ("intercooler") which beneficially increases the charge air density and lowers the quantity of exhaust pollutants. In this system the engine lubricating ("lube") oil cooler is positioned just prior to the coolant pump in the coolant circuit, where it utilizes the entire coolant flow for the purpose of lowering the engine lube oil temperature.

U.S. Pat. No. 5,415,147 (the '147 patent) describes a temperature regulating system for a turbocharged internal combustion engine having one coolant fluid pump and one or more flow paths where coolant fluid may be directed, depending on the engine operating conditions. In one flow path, heated coolant from the engine is cooled by a primary radiator with a split outflow such that a portion may be further cooled in a subcooler that is in the upstream air flow of the primary radiator. The coolant portion flowing through the subcooler is directed either to an engine intake air intercooler or back to a reservoir. In another flow path, some heated engine coolant may be directed to the intercooler to heat the engine intake air.

The temperature regulating system of U.S. Pat. No. 5,415,147 uses three "Modes" of operation described as follows:

Mode 3: Some hot coolant outflow from the engine is used to heat the engine intake air in the intercooler. Radiators and subcoolers are drained. Mode 3 is used when the coolant is at its coldest, such as when warming the locomotive after starting a cold engine.

Mode 2: Radiators and subcoolers are used to cool some hot coolant outflow from the engine. The remainder is used to heat the engine intake air in the intercooler. Mode 2 is used when coolant temperature is high enough to warrant cooling with the radiators but is not high enough to indicate that engine intake air cooling in the intercooler is necessary.

Mode 1: Radiators and subcoolers cool all the hot coolant outflow from the engine. Coolant passing through the subcoolers is used to cool the engine intake air in the intercooler. Mode 1 is used when coolant temperatures are highest, such as when the engine is at the highest-power levels and/or when the highest ambient air temperatures are encountered.

The temperature regulating system of U.S. Pat. No. 5,415,147 uses the particular flow paths for each of the three modes described above, along with a flow control system valving composed of one valve assembly V1, (a two-position three-way "T-Port" rotary valve shafted to an external air powered actuator and an on-off butterfly valve for drainage of radiator inlet piping), and one valve assembly V2, (a two-position three-way "L-Port" valve shafted to an external air powered actuator and an on-off butterfly valve for drainage of the subcooler outlet piping). If the air ports to the two-position actuators are labeled 1 and 2, and the flow ports to the three way valves are labeled A, B, and C, Table I shows all possible combinations of V1 and V2 positions, depending on which actuator air ports are supplied with compressed air. Three of the four combinations are used for implementing Modes 1, 2 and 3 described above.

TABLE I

Cooling System Mode vs. V1 and V2 Position

| MODE | V1 Pos | V2 Pos | V1 3-Way | V1 BFly | V2 3-Way | V2 B-Fly | Flow Descript |
|---|---|---|---|---|---|---|---|
| 3 | 2 | 1 | C to B | Open | C to B | Open | Eng to W/T & I/C Rad & S/C to W/T |
| 2 | 1 | 1 | C to A | Closed | C to B | Open | Eng tRad & I/C, S/C to W/T |
| 1 | 1 | 2 | C to A | Closed | A to B | Closed | Eng to Rad, S/C to I/C |
| X | 2 | 2 | C to B | Open | A to B | Closed | Not Used |

In Table I, the following abbreviations are used: Eng. for engine; W/T for water tank; I/C for intercooler; Rad. for radiator; and S/C for subcooler.

In the design of this type of locomotive cooling system, if the coolant is water, the system must be able to quickly drain the radiator, subcooler, and associated piping to the reservoir by gravity to avoid coolant freezing and consequential equipment damage in cold climatic conditions. Because the locomotive may be inclined with either end higher than the other, the design must avoid pipe or radiator runs that could lead to trapped coolant which could freeze. In the cooling system of the '147 patent, the orientation of the radiator and subcooler in the coolant-to-air heat exchanger positions the inlet at the front end of the locomotive, and there will be no trapped water in this system provided the radiator and return pipes have respective tilts greater than the greatest expected rail inclination. The location and functioning of the engine lube oil cooler in the '147 patent is similar to that in U.S. Pat. No. 5,201,285, where the entire flow of coolant is passed through the oil cooler at an inlet temperature nearly the same as that of the primary radiator outflow.

In the prior art cooling system design, lube oil cooling ability is limited because the shell and tube lube oil cooler use the entire flow of coolant that passes through the coolant pump to lower the temperature of the lube oil outflow from the engine. While the majority of this coolant is cooled solely by the primary radiators, a lesser quantity, though further cooled by the subcoolers, is later reheated by use in the intercoolers prior to rejoining the flow from the primary radiators in the coolant tank. As a consequence, the coolant temperature to the lube oil cooler is approximately the same as the primary radiator outflow temperature, and this limits the temperature reduction that may be accomplished in the lube oil cooler.

In the prior art cooling system design, locating the oil cooler upstream of the water pump disadvantageously tends to increase suction at the pump inlet. To avoid cavitation and possible damage, it is necessary to maintain a certain flow area (and weight) for the water side coolant passages of the oil cooler to avoid a large coolant pressure drop in addition to the primary task of providing heat transfer from the lube oil. Additionally, in the prior art cooling system design, having the oil cooler located between the water tank and the water pump, leaves little room for the coolant and oil piping to establish long enough runs to easily withstand inevitable assembly and transient operating misalignments. The tight space envelope also impedes assembly and maintenance tasks.

SUMMARY OF THE INVENTION

The present invention is illustrated, in one form, in an enhanced fluid cooling system and method for a turbocharged internal combustion engine that allows for optimum cooling of the engine jacket, turbochargers, lubricating oil, and intake air, and which is controlled using ambient air temperature, engine power level, and average system coolant temperature as the primary controlling variables.

In the illustrative embodiment, a single coolant-to-air heat exchanger has one inlet and multiple outlets at varying coolant temperatures and flows. This heat exchanger constitutes a primary radiator for engine jacket and turbo cooling, with a first subcooler in the upstream air flow of the primary radiator for lube oil cooling, and a second subcooler upstream of the first subcooler for engine intake air cooling. The coolant flow is developed by a single engine driven coolant pump with each of several flow paths orificed and valved to provide the desired flow rate for each specific flow path at each specific operating condition. This arrangement enables each component of the cooling system to operate with the optimum coolant temperature for each circuit at given specific engine conditions without requiring many individual cooling systems and individual temperature control systems. Further, the system provides increased vehicle performance capability because it can provide lower lubricating oil temperatures for a given high temperature ambient air condition. Therefore, the vehicle is capable of providing full performance at higher temperature ambient air conditions than is currently allowed.

One implementation of the present invention is in a cooling system in which the coolant-to-air heat exchanger is composed of an engine jacket and turbo cooling radiator with a subcooler in the air flow upstream of the radiator (to provide cold coolant to the oil cooler) and a second subcooler upstream of the first (to provide cold coolant to the engine charge air intercooler). By incorporating a separate oil cooler subcooler and a separate oil cooler coolant circuit, it becomes possible to provide colder coolant to the oil cooler and achieve lower oil temperatures for given operational conditions even while using a lower coolant flow rate in the oil cooler circuit. A plate type heat exchanger (PHE) oil cooler is used on the pressure side of the coolant circuit because it operates with a higher coolant pressure drop. This creates more turbulent flow and an inherently higher overall heat transfer coefficient, "U", than is found with shell and tube types. By moving the oil cooler away from the coolant pump inlet pipe, a source of pressure drop that can lead to pump cavitation is eliminated. Removing the oil cooler from the pump area also relieves piping and hose congestion and allows longer pipe and hose runs which better accommodate assembly and operating misalignments. With a higher U-value and simple construction, PHE types may be smaller, lighter, and less costly than a shell and tube equivalent. The more turbulent flow conditions in the PHE result in less loss of performance when an antifreeze mixture is substituted for water, and a PHE, unlike a shell and tube type, may be easily resized to compensate with the addition of more plates.

This system provides increased engine life and vehicle reliability and productivity because it provides lower engine oil temperatures for given high ambient air temperatures, and lower engine oil temperature results in higher viscosity and better protection of the engine crank bearings and other components. Further, longer intervals can be employed between oil changes when oil change intervals are set by measured undesirable acidity or viscosity changes in the oil. This is because these undesirable changes are accelerated by high temperature conditions and slowed by lower temperature conditions. For a given duty cycle, the system runs with lower oil temperatures. In addition to the lower oil temperatures over most of the range of ambient air conditions encountered, lower engine and intake air temperatures are provided.

Providing oil cooling with a plate heat exchanger (PHE) type oil cooler instead of a shell and tube type results in reductions in cost, size, and weight and better coolant pump inlet conditions because the oil cooler heat exchanger is relocated from the suction side of the circuit (upstream of the coolant pump) to the pressure side of the circuit (upstream of the water tank). The PHE type oil cooler also exhibits less performance loss if "anti-freeze" coolant mixtures are used, and an ability to be easily resized to compensate, if desired, unlike the fixed one size of a shell and tube type oil cooler.

The system offers advantages in piping layout over the previous system due to the relocation of the lube oil cooler which relieves piping congestion and allows longer, straighter runs for pipes and hoses.

The advantages and benefits described above are obtained by improving effectiveness of the cooling system. Alternative ways of providing lower coolant and lube oil temperature, such as increasing the radiator heat transfer area and/or increasing the radiator air flow velocity disadvantageously require larger and more expensive components in the first instance and lowered fuel economy in the second instance due to increased fan power consumption.

The system offers the foregoing advantages and benefits while being comprised of a group of retrofittable parts and assemblies that may be installed on an existing fleet of locomotives.

DETAILED DESCRIPTION OF THE INVENTION

Figure 1:
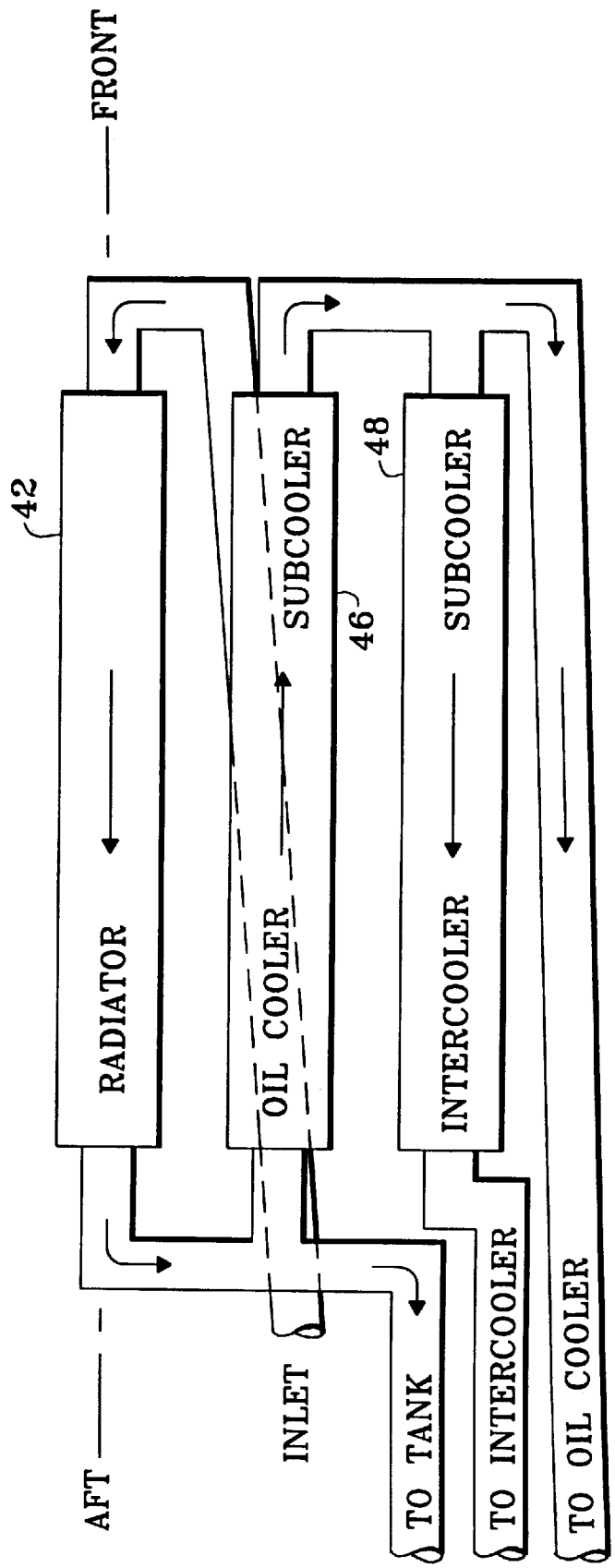
FIG. 1 is a schematic representation of a radiator and subcoolers arranged in a manner contemplated by the present invention, particularly with respect to a horizontal line extending from a front end to an aft end of a locomotive.
Figure 2:
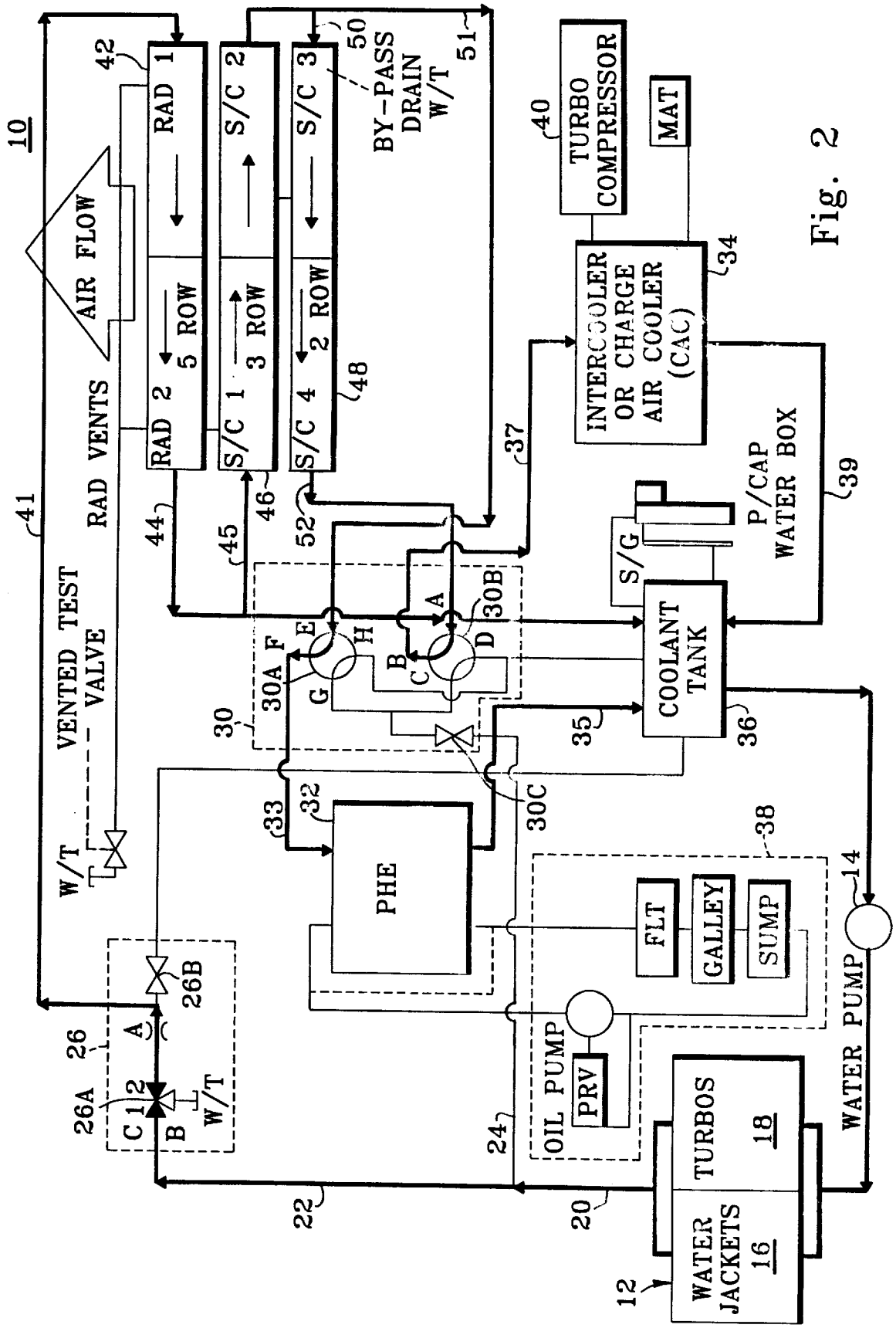
FIGS. 2–4 are schematic representations of an illustrative enhanced split cooling system using the teachings of the present invention and operating in respective Modes 1, 2 and 3.
Figure 3:
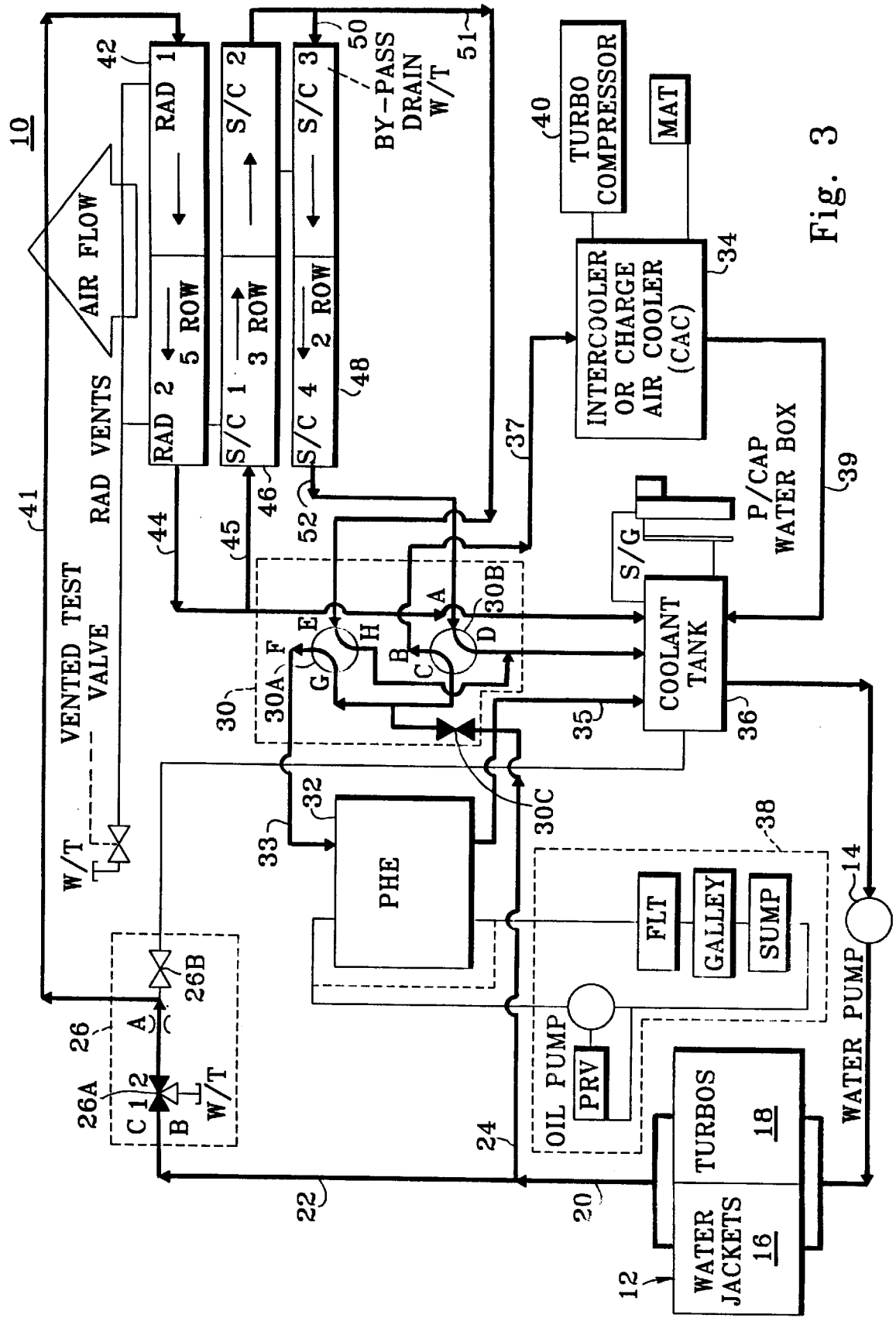
Figure 4:
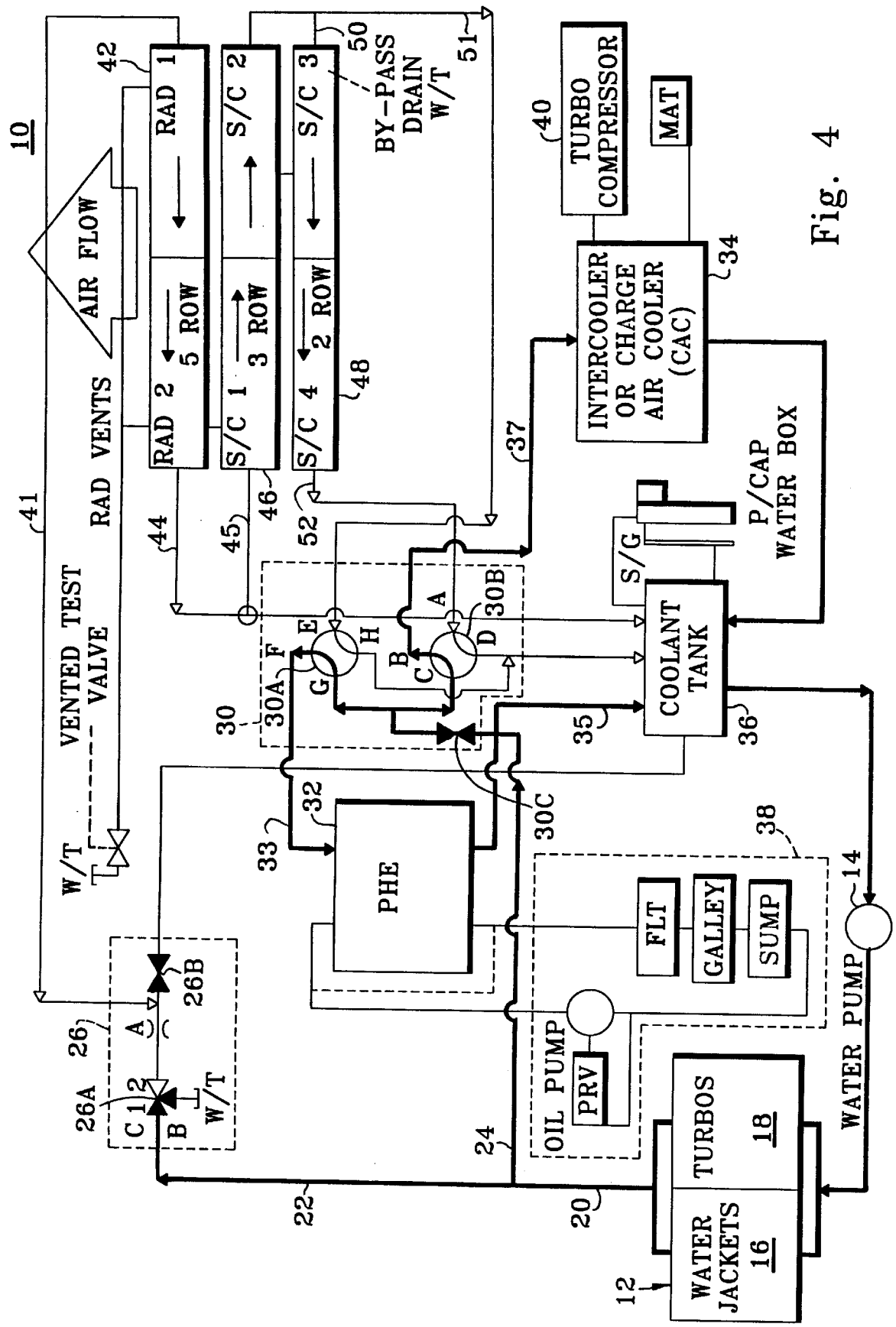

With particular reference to FIGS. 1 and 2–4, the invention is illustrated in an enhanced split cooling system 10 for a diesel engine 12 of a self-propelled rail traction vehicle with a single coolant pump 14. The illustrative implementation, as shown particularly in FIGS. 2–4, shows schematically how coolant sent to engine 12 splits, with some coolant going around the cylinders of the engine via the engine water jackets 16 to cool the combustion chambers, and with other coolant cooling a turbocharger 18 bearing area, i.e., cooling the mechanical components of turbocharger 18 which need cooling due to heat from hot exhaust gas and hot compressed intake air. The two coolant streams then leave the engine and turbocharger (which are generally bolted together) and rejoin as an output stream 20 which may be contained in conventional coolant piping or other coolant-conducting line splits the output stream into a first portion in line 22 and a second portion in line 24. Heated coolant in line 22 flows to a valve assembly 26 comprised of a two-position, three-way T-port rotary valve 26A shafted to an exterior air-powered actuator (not shown) and an on-off butterfly-type flow backing valve 26B for drainage of radiator inlet piping. Coolant portion 24 is directed to a valve assembly 30 comprised of a butterfly-type flow blocking valve 30C which permits coolant to be selectively directed from the engine to a pair of parallel connected four-way double-L rotary valves 30A, 30B in a common housing shafted to an external air-powered rotary actuator (not shown). The rotary actuator controls the positions of valves 30A, 30B and 30C concurrently. Valves 30A, 30B allow hot engine coolant to be directed to a lube oil cooler 32, or to an intercooler 34, or to a coolant storage tank 36, when valve 30C is open. Lube oil cooler 32 is preferably a plate-type heat exchanger. If the coolant is directed by valve 30A to lube oil cooler 32 (via line 33), the coolant passes in heat exchange relationship with lube oil pumped through cooler 32 from oil system 38 and then flows back to storage tank 36 via line 35. If the coolant is directed into line 37 by valve 30B, the coolant flows through intercooler 34 and then returns via line 39 to tank 36. Intercooler 34 cools the heated compressed air from turbo compressor 40. While shown separated in the Figures, it will be recognized that compressor 40 is part of turbocharger 18 and that intercooler 34 is physically mounted adjacent turbocharger 18.

Coolant flow via line 22 and valve 26 is directed via line 41 to a horizontally disposed radiator 42. The flow out of radiator 42 is coupled via line 44 to coolant tank 36 and via line 45 to subcooler 46. Flow out of subcooler 46 is coupled into a second subcooler 48 via line 50 and to valve 30A via line 51. The coolant flow from subcooler 48 is coupled via line 52 to valve 30B. Both subcoolers 46 and 48 are horizontally disposed and are parallel with the radiator. The radiator and subcoolers are arranged in two banks so that there are actually two radiators, two lube oil subcoolers and two intercooler subcoolers. A pair of blowers (not shown) blow cooling air over the radiators and subcoolers.

Both valve assemblies 26 and 30 have only two positions each. Three modes are created by the combinations of these two positions. Four combinations possible but only three are actually used, as follows:

Mode 1 is a normal engine operating mode in which coolant is used for cooling and all the outflow from the engine is passed to the radiator. A portion of the coolant from the radiators is returned to the coolant tank while another portion is passed to the lube oil subcoolers. A portion of the lube oil subcoolers coolant outflow is sent to the lube oil cooler while another portion of the outflow is sent to the intercooler subcoolers and then to the intercoolers.

Mode 2 is used at lower operating temperatures than Mode 3, wherein some hot coolant outflow from the engine is used to heat the engine intake air in the intercooler, some is used to heat the engine lube oil in the lube oil cooler, and some coolant flows to the radiators and is returned to the coolant tank.

Mode 3 is used at start-up or in extremely cold weather when engine heat is needed to heat the engine intake air in the intercooler and to heat the engine lube oil in the lube oil cooler.

FIGS. 2, 3 and 4 are identical in structure, but differ in the status of valve assemblies 26 and 30. FIG. 2 corresponds to Mode 1, FIG. 3 to Mode 2, and FIG. 4 to Mode 3. The valve status is shown by the arrowheads. If a valve is open allowing flow therethrough, the arrowheads are darkened or solid. If a valve is closed and blocking flow therethrough, the arrowheads are not darkened. For example, considering valve assembly 26 in FIG. 2, the in line arrowheads associated with valve 26A are solid, indicating that the valve is in an open position and that coolant flow can pass through the valve from line 22 into line 41. However, butterfly valve 26B is not darkened and therefore is in a closed state, blocking any coolant flow that would pass through that valve into coolant tank 36. Similarly, butterfly valve 30C associated with valve assembly 30 is not shown solid and is therefore closed, blocking coolant flow into valve assembly 30. In this mode, corresponding to Mode 1, coolant from water pump 14 is forced through engine 12, passing in heat exchange relationship with the engine cylinders via the water jackets and in heat exchange relationship with the mechanical elements of turbocharger 18, exiting from the engine via line 20. The coolant flows from line 20 through line 22 and valve 26A into line 41 and then to radiator 42. From radiator 42, the coolant progresses via line 44 to both the coolant tank 36 and subcooler 46. From subcooler 46, the coolant flows via line 50 into the second subcooler 48 and into valve 30A. That portion of the coolant flowing directly into valve 30A is directed by valve 30A from the input port E to the output port and then via line 33 into oil cooler 32. After extracting heat from oil being pumped through oil cooler 32, the coolant passes via line 35 back to coolant storage tank 36. That portion of the coolant which passed through subcooler 48 is then directed through the second portion 30B of valve assembly 30, passing from input port A to output port B and then into intercooler 34 for extracting heat from the compressed air generated by turbocompressor 40. The coolant then flows via line 39 back to coolant tank 36.

As described above, Mode 2 is a mixed mode in which some of the coolant is used in the engine oil cooler and the intercooler, while another portion of the coolant is passed into radiator 42. FIG. 3 illustrates Mode 2 in which valve portion 26A of valve assembly 26 is still in an open condition, allowing coolant flow through valve section 26A and into line 41 and then to radiator 42. At the same time, valve assembly 30 has been actuated so that butterfly valve 30C is now open and valves 30A and 30B have been rotated so as to connect input port G to output port F in valve 30A and input port C to output port B in valve 30B. This allows heated coolant from engine 12 to be directed through valves 30A and 30B*b* into oil cooler 32 and intercooler 34. The status of each of valve assemblies 26 and 30 is controlled by an on-board computer system which controls all of the functions of engine 12. However, control of valve assemblies 26 and 30 is based primarily upon monitoring of coolant temperature but could also be controlled as a function of oil temperature and air temperature from the turbocompressor. In Mode 2, the oil temperature has not quite reached a desired operating level and therefore some additional heating is required from the heated engine coolant to bring the oil temperature up to a desired operating state. Similarly, the engine coolant is used to heat the turbocompressor output air in order to bring the air up to a desired temperature before injection into the engine.

Mode 3 is illustrated by FIG. 4 in which valve assembly 30 is configured to pass heated coolant into oil lube cooler 32 and intercooler 34. Valve assembly 26 is positioned to allow some coolant to return to coolant tank 36 but not to allow coolant flow into radiator 42. However, butterfly valve 26B is open to allow the radiator to drain into coolant tank 36.

In general, engine operation starts at Mode 3 and then gradually transitions through Mode 2 and into Mode 1 as engine operating temperature rises. However, if the outside air temperature is sufficiently low, the engine can remain in Mode 3 or Mode 2 and thus provide heating to lube oil cooler 32 and intercooler 34. The present invention includes the steps of providing the system components as enumerated, described and discussed above. Such providing of components is followed by the step of selecting the setting for the valve assemblies whereby any one preselected mode of operation may be performed to the exclusion of the other two as a function of the ambient conditions and the intended result.

Table II, hereinafter, presents estimated lube oil and coolant temperatures from computer simulated steady state locomotive operation at maximum power output at two ambient air temperatures for both the prior art cooling system design and for the enhanced cooling system design. Table II shows that for a locomotive of prior art design, lube oil temperature exiting the engine may be 115.4° F. above the 130° F. ambient air temperature during maximum power generation. If it is assumed, for example, that 245.4° F. is the maximum allowable, or "set point" lube oil temperature, then ambient air temperature any higher than 130° F. will raise the lube oil above the maximum allowable temperature and the locomotive control system will reduce power output of the engine to bring the oil temperature down into the allowable range. Thus, the highest ambient air temperature in which a locomotive will produce full power can be limited by the locomotive's ability to maintain the lube oil temperature below an allowable maximum. It is also true that if a locomotive cooling system is designed to keep the lube oil below the allowable maximum temperature at higher ambient air temperature, it will also have the capability of providing lower lube oil temperature at lower ambient air temperatures and therefore, for a given duty cycle, will provide potentially longer engine component life and greater allowable intervals between oil changes.

The present invention provides lower lube oil temperatures while maintaining the currently acceptable low engine jacket and turbocharger coolant temperatures and engine intake air temperatures for the greatest range of possible operating conditions. This also increases the maximum ambient air temperature capability of the locomotive prior to engine deration.

TABLE II

Cooling System Temperature Comparison: Notch 8 (max power) with 450 GPM Lube Oil and Two Ambient Air Temperatures

| | Prior Art System Cooling System | | Enhanced Split | |
|---|---|---|---|---|
| Ambient Air Temp: | 70° F. | 130° F. | 70° F. | 130° F. |
| Loco Parameter: | | | | |
| Engine Water In | 167.9 | 213.3 | 157.6 | 205.7 |
| Engine Water Out | 185.1 | 230.8 | 174.3 | 223.1 |
| Oil Cooler Oil In | 200.0 | 245.4 | 192.5 | 230.1 |
| Oil Cooler Oil Out | 182.7 | 228.1 | 175.1 | 213.1 |
| Intercooler Air In | 377.0 | 443.0 | 377.0 | 443.0 |
| Intercooler Air Out | 132.8 | 182.0 | 125.3 | 183.5 |
| Radiator Water Out | 162.0 | 206.8 | 159.1 | 205.1 |
| Oil Cooler Water In | 161.5 | 206.9 | 140.7 | 185.1 |
| Oil Cooler Water Out | 167.9 | 213.3 | 158.1 | 202.6 |

Because of the need to be able to retrofit the enhanced split cooling hardware into existing locomotives, it is necessary that the radiator and two subcoolers of the new design occupy no more vertical space than is used currently by the prior art radiator and single subcooler. As FIG. 1 shows, the present invention accomplishes this by removing the fore and aft tilt previously built into the radiators and subcoolers and by using an inlet pipe that passes between the right and left banks of radiators before entering in the front end rather than aft end. This reduces to one, the number of tilted return pipes that must pass back to the aft end below the lowest subcooler. The radiator and subcoolers of the new design have connections at both ends of each component, and this allows the prior tilt to be eliminated without preventing quick drainage.

If the valve position air input ports to the two position actuators (not shown, but controlling valve assemblies 26 and 30) are labeled 1 and 2, and the flow ports at the three-way valve assembly 26 labeled A–C, and the flow ports at the four-way valve assembly 30 labeled A–H as in FIGS. 2–4, Table III shows all possible combinations of valve assembly positions, depending on which actuator air ports are supplied with compressed air. Three of the four combinations are used to achieve the operational modes described above, while the fourth combination is not used

TABLE III

Enhanced Cooling System Mode vs. V1 and V2 Position

| MODE | V1 Pos. | V2 Pos. | V1 3-Way | V1 B'Fly | V2 IC 4-Way | V2 O/C 4-Way | V2 B'Fly |
|---|---|---|---|---|---|---|---|
| 3 | 2 | 1 | C to B | Open | C to B | G to F | Open |

Flow Description: Portions of Engine Outflow go to the Coolant Tank, Oil Cooler and Intercooler. Radiators, Oil Cooler Subcoolers and Intercooler Subcoolers drain to the Coolant Tank.

| 2 | 1 | 1 | C to A | Closed | C to B | G to F | Open |
|---|---|---|---|---|---|---|---|
|   |   |   |        |        | A to D | E to H |      |

Flow Description: A Portion of Engine Outflow goes to the Radiators, Subcoolers and Coolant Tank. Another Portion of Engine Outflow goes to the Oil Cooler and Intercoolers.

| 1 | 1 | 2 | C to A | Closed | A to B | E to F | Closed |
|---|---|---|---|---|---|---|---|
|   |   |   |        |        | C to D | G to H |        |

Flow Description: All Engine Outflow goes to the Radiators. Radiators drain to the Coolant Tank and Oil Cooler Subcoolers. Oil Cooler Subcoolers drain to the Oil Cooler and Intercooler Subcoolers. Intercooler Subcoolers drain to the Intercoolers.

| X | 2 | 2 | C to B | Open | A to B | E to F | Closed |
|---|---|---|---|---|---|---|---|
|   |   |   |        |      | C to D | G to H |        |

Flow Description: Not Used

Comparison between the calculated temperatures of the prior art and enhanced cooling system designs in Table II shows that at a 70° F. ambient air temperature, the enhanced split cooling system described here will supply the engine jackets and turbos with water about 10° F. colder, the engine components with lube oil about 8° F. colder, and the engine intake manifold with air that is about 8° F. colder. At an ambient air temperature of 130° F. the enhanced system will supply about 8° F. colder engine jacket and turbo water, about 15° F. colder engine lube oil, and will supply engine manifold air that is about 2° F. hotter.

In summary, the proposed enhanced system is capable of a 15° F. reduction in lube oil temperature under worst case conditions or, alternatively, may allow the locomotive to operate in greater than 15° F. hotter ambient air conditions prior to derating, in comparison with the prior art system. What is sacrificed is that at extremely high ambient air temperatures, the calculations predict a very small (and perhaps not measurable) loss in fuel economy due to hotter manifold air, and this is far better than engine deration for the locomotive operator. For the vast majority of ambient air conditions the calculations predict lower manifold air, engine water, and engine lube oil temperatures for the enhanced cooling system design of the present invention.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An enhanced split cooling system for a turbocharged internal combustion engine including a liquid cooled turbocharger and an engine liquid coolant jacket, comprising:

a coolant pump for pumping coolant from a coolant storage tank into heat exchange relationship with the engine jacket and turbocharger;

an oil cooler;

a first valve assembly including a blocking valve and a pair of flow directing valves;

a first coolant output line for conveying coolant from the engine to the first valve assembly and a second coolant output line for selectively flowing coolant from the engine to the oil cooler;

a second valve assembly including a blocking valve and a flow directing valve, said first coolant output line being connected to an input of said second valve assembly;

a radiator connected via a third coolant line for receiving coolant from the second valve assembly and having a coolant outflow line to return coolant to the coolant tank;

an intercooler operatively associated with the turbocharger for passing the coolant in heat exchange relationship with compressed air in the turbocharger;

a lube oil subcooler coupled by a fourth coolant flow line to receive coolant from the radiator and having a coolant outflow line selectively couplable through the first valve assembly to the oil cooler and the coolant tank; and an intercooler subcooler coupled by a fifth coolant flow line to receive coolant from the first subcooler and having a coolant outflow line selectively couplable through the first valve assembly to the coolant tank and the intercooler;

each of the first and the second valve assemblies being independently operable for selectively directing coolant flow through the radiator and subcoolers and the oil cooler and intercooler as a function of engine operating temperature.

2. The system of claim 1 wherein the first and second valve assemblies are operable in a mode to pass all the coolant outflow from the engine through the radiator prior to passing the coolant in heat exchange relationship with the lube oil cooler and the intercooler.

3. The system of claim 1 wherein the first and second valve assemblies are operable in a mode to pass a portion of the heated coolant outflow from the engine to the intercooler to heat the turbocharger compressed air in the intercooler and to pass another portion to the lube oil cooler to heat the engine lube oil in the lube oil cooler.

4. The system of claim 1 wherein the first and second valve assemblies are operable in a mode to pass a first portion of the heated coolant outflow from the engine to the intercooler to heat the turbocharger compressed air in the intercooler, to pass another portion to the lube oil cooler to heat the engine lube oil in the lube oil cooler, and to return still another portion directly to the coolant tank.

5. The system of claim 1 wherein the first and second valve assemblies are selectively operable in three modes including: (a) a first mode wherein all the coolant outflow from the engine is directed to pass through the radiator and is then divided into a first portion for return to the coolant tank and a second portion for passage to the lube oil subcooler, and wherein a portion of the lube oil subcooler outflow is directed to pass to the lube oil cooler while another portion is directed to pass to the intercooler subcooler and thence to the intercooler; (b) a second mode wherein some heated coolant outflow from the engine is directed to pass to the intercooler to heat the turbocharger compressed air in the intercooler and some heated coolant outflow from the engine is directed to pass to the lube oil cooler to heat the engine lube oil in the lube oil cooler; and (c) a third mode wherein some heated coolant outflow from the engine is directed to pass to the intercooler to heat the turbocharger compressed air in the intercooler while some outflow is directed to pass to the lube oil cooler to heat the engine lube oil in the lube oil cooler and the remainder of the outflow is directed to return to the coolant tank.

6. The system of claim 1 wherein the oil cooler comprises a plate type heat exchanger.

7. The system of claim 1 wherein the radiator, lube oil subcooler and intercooler subcooler are horizontally disposed in parallel relationship.

8. The system of claim 1 wherein the oil cooler comprises a plate type heat exchanger and wherein the radiator, first subcooler and second subcooler are horizontally disposed in parallel relationship.

9. The system of claim 5 wherein the oil cooler comprises a plate type heat exchanger and wherein the radiator, first subcooler and second subcooler are horizontally disposed in parallel relationship.

10. The system of claim 1 wherein the flow directing valves of the first valve assembly comprise four-way flow directing valves and the flow directing valve of the second valve assembly comprises a three-way flow directing valve.

11. An enhanced split cooling system for a turbocharged internal combustion engine including a liquid cooled turbocharger and a liquid coolant engine jacket, a coolant pump for pumping coolant from a coolant storage tank into heat exchange relationship with the engine and turbocharger and for circulating the coolant back to the tank, the system further including a lube oil cooler and a turbocharged air intercooler coupled in a coolant circulation path, a primary radiator selectively connectable for passing the coolant in heat exchange relationship therethrough, a pair of subcoolers positioned downstream of the primary radiator for providing additional cooling of coolant passing therethrough, a first valve assembly connected in said coolant circulation path for directing heated coolant exiting said engine jacket into said oil cooler and said intercooler when engine operating temperature is below a first threshold value, and a second valve assembly for directing all of the circulating coolant through the radiator and subcoolers for reducing coolant temperature and then passing the cooled coolant in heat exchange relationship through the oil cooler and the intercooler when the engine operating temperature is above a second threshold value, each of said first and second valve assemblies being opened when engine temperature is between the first and second threshold values for splitting the circulating coolant into a first path through said radiator and subcoolers to said storage tank and into a second path through the oil cooler and intercooler to said storage tank.

* * * * *